United States Patent [19]

Kuma et al.

[11] Patent Number: 5,561,808
[45] Date of Patent: Oct. 1, 1996

[54] ASYMMETRIC VECTOR MULTIPROCESSOR COMPOSED OF A VECTOR UNIT AND A PLURALITY OF SCALAR UNITS EACH HAVING A DIFFERENT ARCHITECTURE

[75] Inventors: Takao Kuma; Kenichi Sakai, both of Kawasaki, Japan

[73] Assignee: Fujitsu Limited, Kawasaki, Japan

[21] Appl. No.: 254,758

[22] Filed: Jun. 6, 1994

[30] Foreign Application Priority Data

Jul. 13, 1993 [JP] Japan .................................. 5-173354

[51] Int. Cl.⁶ ..................................................... G06F 9/30
[52] U.S. Cl. ...................... 395/800; 395/375; 395/500; 364/225.1; 364/DIG. 1
[58] Field of Search ................................. 395/800, 500, 395/375

[56] References Cited

U.S. PATENT DOCUMENTS

| | | | |
|---|---|---|---|
| 4,812,975 | 3/1989 | Adachi et al. | 395/500 |
| 5,010,477 | 4/1991 | Omoda et al. | 395/800 |
| 5,197,130 | 3/1993 | Chin et al. | 395/325 |
| 5,218,712 | 6/1993 | Cutler et al. | 395/800 |
| 5,222,244 | 6/1993 | Carbine et al. | 395/800 |
| 5,293,602 | 3/1994 | Fukagawa et al. | 395/425 |
| 5,307,504 | 4/1994 | Robinson et al. | 395/800 |
| 5,404,553 | 4/1995 | Komori et al. | 395/800 |
| 5,418,973 | 5/1995 | Ellis et al. | 395/800 |
| 5,426,754 | 6/1995 | Grice et al. | 395/425 |
| 5,430,862 | 7/1995 | Smith et al. | 395/500 |
| 5,438,668 | 8/1995 | Coon et al. | 395/375 |

*Primary Examiner*—Alyssa H. Bowler
*Assistant Examiner*—Robert E. Stachler, II
*Attorney, Agent, or Firm*—Staas & Halsey

[57] ABSTRACT

A vector multiprocessor comprises a plurality of scalar units for executing a scalar instruction and a vector unit for executing a vector instruction, and processes, through a single vector unit, vector instructions transmitted from the plurality of scalar units having architectures different from those of the vector unit. The vector unit comprises one or more instruction converting circuits, each corresponding to each of the one or more architectures of the plurality of scalar units different from the architecture of the vector unit, for converting vector instructions transmitted from the one or more scalar units into instruction forms executable in the vector unit, and a vector instruction executing unit for executing a vector instruction transmitted from the instruction converting circuit or from the scalar unit having the compatible architecture as the vector unit.

10 Claims, 11 Drawing Sheets

| INPUT BIT 2 | OUTPUT OF 53 | OUTPUT OF 55 |
|:---:|:---:|:---:|
| 0 | 0 | 0 |
| 0 | 1 | 1 |
| 1 | 0 | 1 |
| 1 | 1 | 0 |

57 : BUFFER
58 : INVERTER

| HEXADECIMAL REPRESENTATION | BINARY REPRESENTATION bit 0 1 2 3 4 5 6 7 |
|---|---|
| 7F → 5F | 0 1 1 1 1 1 1 1 ↓ INVERTED BIT 2 <br> 0 1 0 1 1 1 1 1 |

FIG. 7A

| HEXADECIMAL REPRESENTATION | BINARY REPRESENTATION bit 0 1 2 3 4 5 6 7 |
|---|---|
| 8F → 9F | 1 0 0 0 1 1 1 1 ↓ INVERTED BIT 3 <br> 1 0 0 1 1 1 1 1 |

FIG. 7B

ASYMMETRIC VECTOR MULTIPROCESSOR COMPOSED OF A VECTOR UNIT AND A PLURALITY OF SCALAR UNITS EACH HAVING A DIFFERENT ARCHITECTURE

BACKGROUND OF THE INVENTION

1. Field of the Invention

The present invention relates to a multiprocessor system, such as a super-computer, comprising a scalar unit for executing a scalar instruction and a vector unit for executing a vector instruction, and more specifically to an asymmetric vector multiprocessor capable of executing, using a single vector unit, vector instructions transmitted from a plurality of scalar units having different architectures.

2. Description of the Related Art

With recent high-performance data processing systems, a plurality of processors are provided in a data processing system, and an exclusive processor used exclusively to process operations and images is provided for a system. For example, a super-computer comprises a scalar processor for performing a scalar operation and a vector processor for performing a vector operation. When a vector operation instruction is detected by a scalar processor, the instruction is transmitted to the vector processor for execution.

A vector processor performs operations repeatedly at a high speed, and works especially efficiently in performing image processes, simulation, etc. where similar operations are repeatedly performed.

The vector processor has an architecture optimized for repeated operations represented, for example, by a DO loop in FORTRAN language, that is:

```
DO 10 I = 1,100
    C(I) = A(I)*B(I)
10 CONTINUE
```

A vector process refers to a process of repeatedly performing a given operation on a plurality of data. An operating unit for repeatedly performing operations is required to perform vector processes at a high speed.

A common microprocessing unit (MPU) executes a multiply instruction MUL 100 times when an instruction to repeat a multiplication 100 times is issued as described above. In this case, the instruction is fetched 100 times, the data are decoded 100 times, and operands are read and written 100 times respectively.

On the other hand, the vector processor performs a process using a single instruction as a series of operations of a register-specified number of repetitions (vector length) when a vector instruction such as multiply and other operation instructions, an input/output instruction, etc. is issued. Therefore, 99 fetching operations, decoding time, etc. can be successfully saved.

Accordingly, the vector processor performs a vector process to realize a highly efficient operations, thereby considerably reducing a total operation time.

Since the vector processor is provided with a plurality of operating units for executing in parallel a number of other instructions existing in the same loop and input/output instructions, higher efficiency can be realized in performing operations if, for example, an add instruction is added in a DO loop in FORTRAN language, that is, if operations represented as follows are to be repeatedly performed.

```
DO 10 I = 1,100
    C(I) = A(I)*B(I)
    F(1) = D(I) + E(I)
10 CONTINUE
```

In a super-computer, as described above, a vector instruction detected by a scalar processor (scalar unit) is transmitted to a vector processor (vector unit) for execution. In this case, a dual scalar processor (DSP) system has two scalar units connected to a single vector unit. FIG. 1 is the block diagram showing the configuration of the DSP system.

In FIG. 1, two scalar units 1 and 2 and a vector unit 3 are connected to a main storage device 4. Each of the scalar units 1 and 2 is connected to the vector unit 3. The DSP system executes vector instructions received from the two scalar units by a switching operation performed by a vector instruction executing unit in the vector unit. At this time, the architectures of the two scalar units connected to the vector unit have been limited to one type only.

Recently, various types of architectures have been developed. Among them, the architecture of a reduced instruction set computer (RISC) has made remarkable improvement in efficiency. However, in this case, a conventional operating system (OS) should be replaced with an OS for a new architecture in order to introduce the new architecture for a scalar unit of a super-computer provided with a scalar unit and a vector unit. If there is no OS for the new architecture, then an optional OS should be developed. Furthermore, if a new architecture is introduced, accumulated software resources for the conventional architecture cannot be utilized.

Since the architecture of a scalar unit is limited to only one type in the above described DSP system, there has been the problem that two different architectures cannot be used, that is, a conventional architecture for one scalar unit, and a new architecture for the other scalar unit.

SUMMARY OF THE INVENTION

According to the present invention, the above described DSP system has a plurality of scalar units, having different architectures, connected to a single vector unit. The present invention aims to allow a vector unit to execute vector instructions received from scalar units having different architectures.

According to the present invention, a plurality of scalar units having architectures different from or the same as each other are connected to a single vector unit. The vector unit processes a vector instruction transmitted from each of the plurality of scalar units. Normally, the architecture of the vector unit of the asymmetric vector multiprocessor can be different from all of the plural types of architectures of the plurality of scalar units. In most cases, one of plural types of the architectures of scalar units matches the type of a vector unit. Described below is the case where the architecture of a vector unit matches one of the types of the architectures of scalar units.

A vector unit comprises one or more instruction converting circuits and a vector instruction executing unit. Each of the one or more instruction converting circuits corresponds to an architectures, among the plural types of architectures of the plurality of scalar units, of scalar units each having a different type of architecture from that of the vector unit, and converts a vector instruction transmitted from each of the one or more scalar units having their own architectures into an instruction form executable in the vector unit.

The vector instruction executing unit executes converted vector instructions transmitted from one or more instruction converting circuits, or a vector instruction transmitted from a scalar unit having the compatible architecture as the vector unit.

If the architecture of the vector unit matches that of one of the plural types of architectures of a plurality of scalar units, then the vector instruction from the scalar unit having the compatible architecture as the vector unit is executed by the vector instruction executing unit without being processed by the instruction converting circuit, that is, without being converted.

On the other hand, if the architecture of the vector unit is entirely different from the plural types of the architectures of the scalar units, then the above described instruction converting circuit is provided for each of the plural types of the architectures of the scalar units. The vector instructions from all the scalar units are converted in the vector unit into executable instruction forms and then executed by the vector instruction executing unit.

Thus, according to the present invention, vector instructions corresponding to a plurality of architectures can be processed by a single vector unit.

BRIEF DESCRIPTION OF THE DRAWINGS

FIG. 7A shows an example of converting an operation code (7F into 5F);

FIG. 7B shows an example of converting an operation code (8F into 9F);

DESCRIPTION OF THE PREFERRED EMBODIMENT

Figure 1:
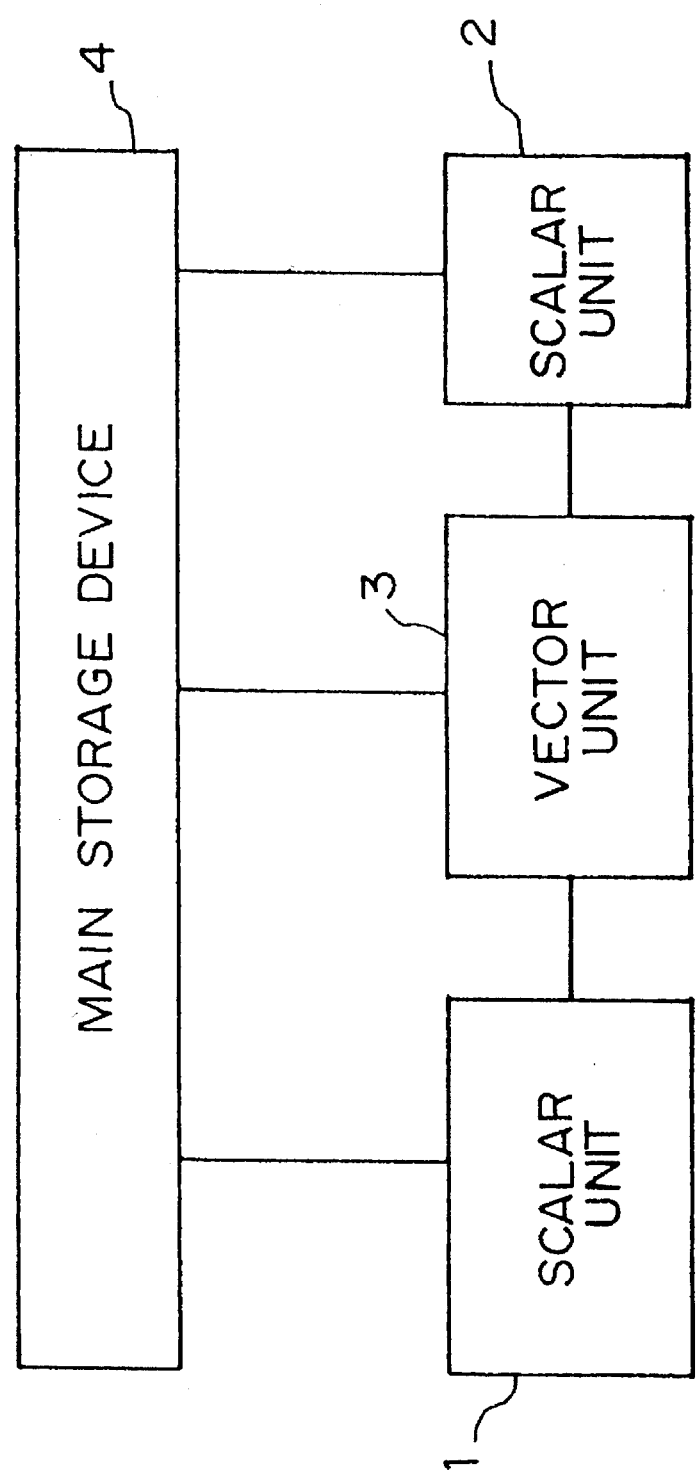
FIG. 1 is the block diagram of the configuration of the conventional DSP system.
Figure 2:
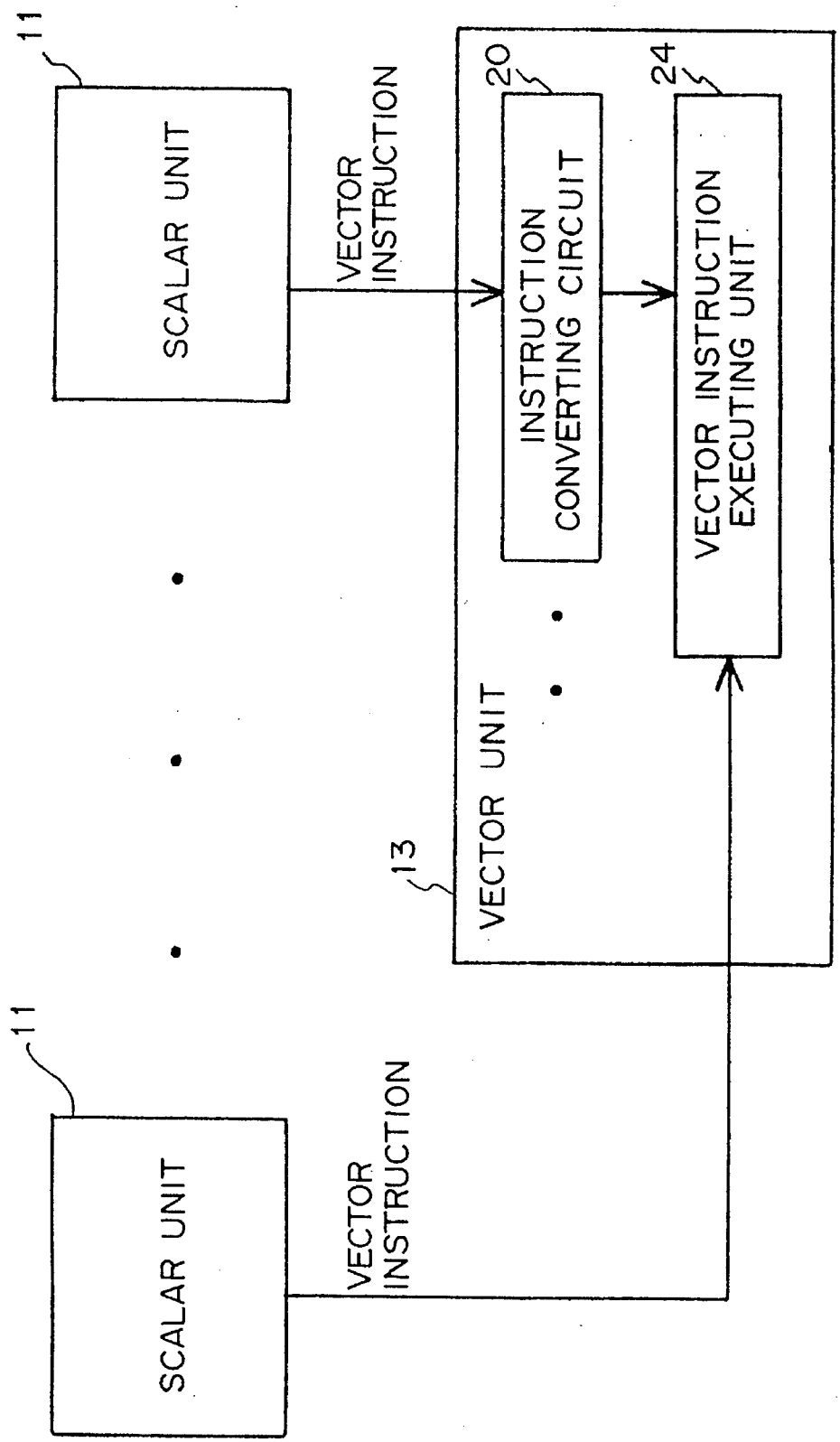
FIG. 2 is the block diagram of the configuration showing the principle of the asymmetric vector multiprocessor according to the present invention.

FIG. 2 is the block diagram of the configuration showing the principle of the present invention capable of executing using a single vector unit 13 vector instructions corresponding to a plurality of architectures in an asymmetric vector multiprocessor comprising a plurality of scalar units 11 for executing scalar instructions and a vector unit 13 for executing the vector instruction transmitted from scalar units 11.

In FIG. 2, an instruction converting circuit 20 is provided in the vector unit 13 correspondingly to one or more architectures of a plurality of scalar units, and converts vector instructions transmitted from scalar units 11 corresponding to the one or more architectures into a form executable in the vector unit 13.

A vector instruction executing unit 24 is provided in the vector unit 13 and executes a vector instruction after it has been converted by the instruction converting circuit 20. In FIG. 2, vector instructions are directly transmitted to the vector instruction executing unit 24 from some scalar units rather than through the instruction converting circuit 20. This corresponds to the case where scalar unit 11 has the compatible architecture as vector unit 13. In this case, there is no need to convert instructions, and a vector instruction is transmitted from scalar unit 11 to the vector instruction executing unit 24 without passing through the instruction converting circuit 20, thus executing the vector instruction.

In addition to the configuration showing the principle of the present invention shown in FIG. 2, a configuration control register for storing the data representing the architecture of each scalar unit 11 connected to the vector unit 13 is provided in the vector unit 13, for example. The configuration control register outputs data representing the architecture to the instruction converting circuit 20. The vector instruction is received from scalar unit 11 through the instruction converting circuit, converted in the vector unit 13 depending on the data into an executable form, and then executed by the vector instruction executing unit 24.

Thus, a single vector unit can execute a plurality of vector instructions in different forms received from the scalar units having a plurality of different architectures.

Figure 3:
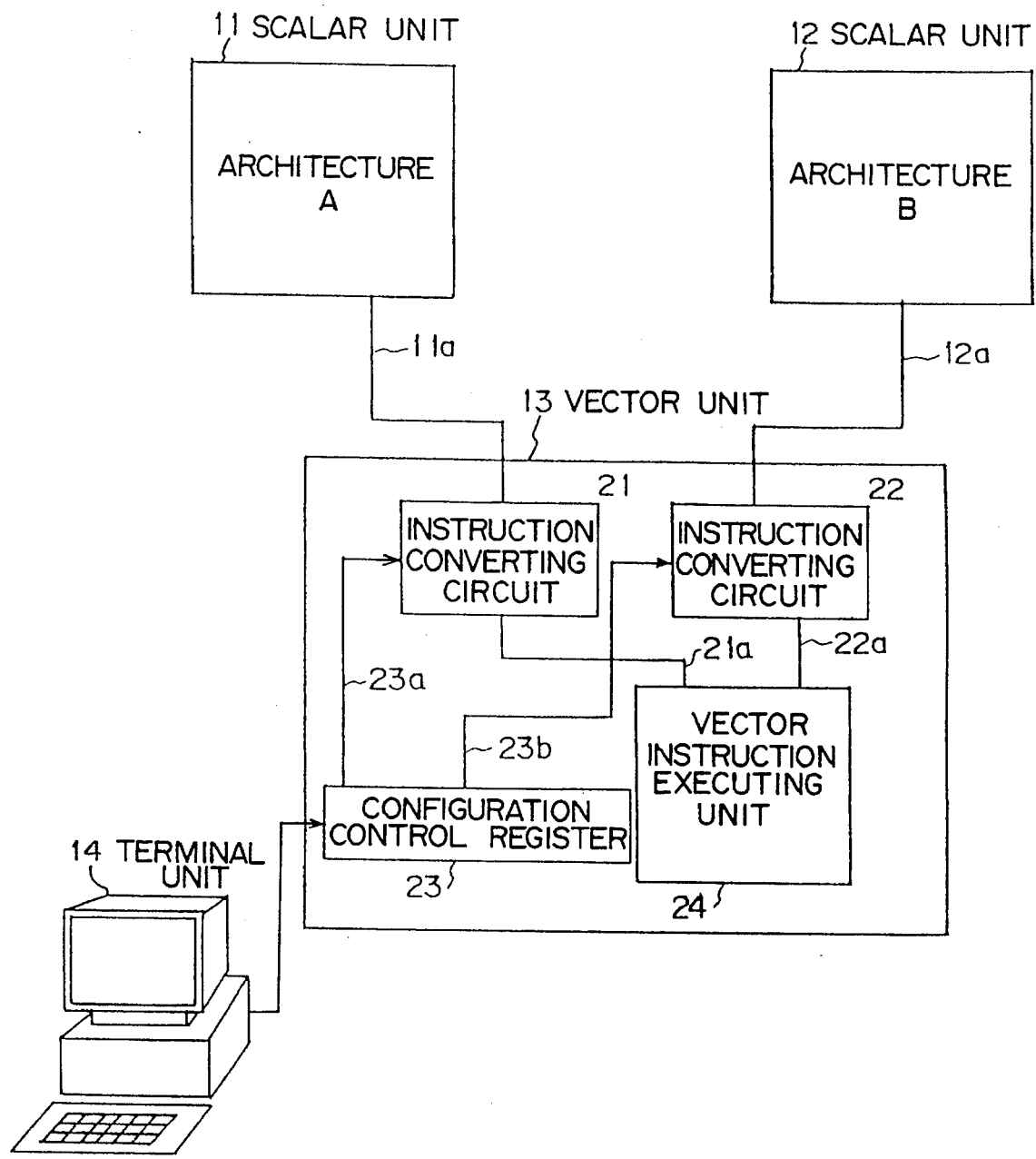
FIG. 3 is the block diagram of the basic configuration showing an embodiment of the DSP system according to the present invention.

FIG. 3 is the basic block diagram of the configuration showing an embodiment of the DSP system according to the present invention. In FIG. 2, two scalar units having different architectures A and B are connected to a single vector unit. That is, scalar unit 11 having architecture A is connected to a vector unit 13 through connection line 11a, and scalar unit 12 having architecture B is connected to the vector unit 13 through connection line 12a.

The vector unit 13 comprises an instruction converting circuit 21 for converting a vector instruction received from scalar unit 11; an instruction converting circuit 22 for converting a vector instruction received from scalar unit 12; a configuration control register 23 for outputting data representing the type of architecture of the scalar unit connected to each of the two instruction converting circuits 21 and 22; and a vector instruction executing unit 24 for executing a vector instruction output by the two instruction converting circuits 21 and 22. The contents of the configuration control register 23 in the vector unit 13 are set through a terminal 14.

The operation in the embodiment shown in FIG. 3 is explained by referring to practical examples of a vector instruction. The following instruction examples ① and ② represent the same purpose and different forms depending on the type of architecture.

① VA R1 R2 R3 → 5F 001 002 003
② VA R3 R2 R1 → 7F 003 002 001

Instruction ① is a vector instruction in the form of architecture A used in scalar unit 11, and instructs to add the contents of vector register 003 in field R3 and the contents of vector register 002 in field R2, and to write the result into vector register 001 in field R1. In architecture A, the operation code of the instruction is 5F.

Instruction ② is a vector instruction in the form of architecture B used in scalar unit 12. Assuming that the vector unit 13 is designed to process vector instruction ① in the form of architecture A, the operation code of vector instruction ② in the form of architecture B received from scalar unit 12 is converted from 7F to 5F, and the register numbers of fields R3 and R1 should be exchanged.

Figure 4:
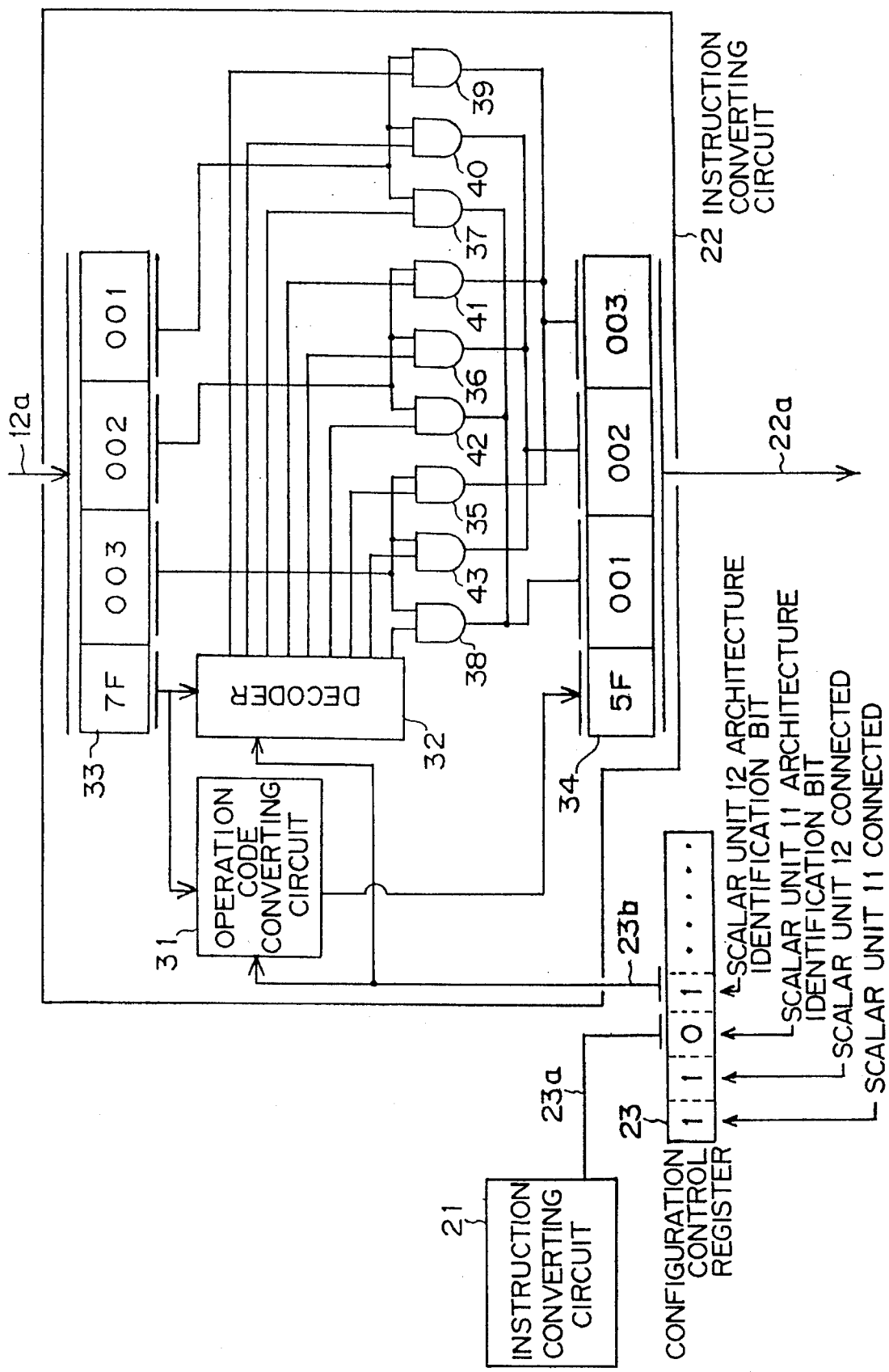
FIG. 4 is the block diagram of the configuration showing the outline of the instruction converting circuit.

FIG. 4 is the block diagram of the configuration showing the outline of the instruction converting circuit 22 shown in FIG. 3. The operation of the instruction converting circuit is explained on assumption that vector instruction ② represented in the form of architecture B is transmitted from scalar unit 12 as described above.

In FIG. 4, the instruction converting circuit 22 comprises a register 33 for storing an unconverted instruction; a register 34 for storing a converted instruction; an operation code converting circuit 31 for converting an operation code; nine AND gates 35–43 for exchanging register numbers; and a decoder 32 for outputting a control signal for these AND gates. The contents of architecture identification bits (described later) are output from the configuration control register 23 shown in FIG. 3 to the operation code converting circuit 31 and the decoder 32 so as to identify the architecture of scalar unit 12.

The contents of vector instruction ② of architecture B are transmitted from scalar unit 12 and stored in register 33. The configuration control register 23 has bits indicating the connecting/disconnecting of scalar units 11 and 12 to the vector unit 13. If the contents of the bits are "1"s, they indicate that the scalar units corresponding to the bits are connected. In this example, the contents of the connection bits for scalar units 11 and 12 are "1"s indicating that scalar units 11 and 12 are connected to the vector unit 13.

The configuration control register 23 has the architecture identification bits for identifying the architecture of a corresponding scalar unit. In the present example, if the bit is "0", it indicates that the architecture is "A". If the bit is "1", it indicates that the architecture is "B". Since the vector unit 13 has architecture compatible with architecture A as described above, the bit "1" indicates that the instruction form should be converted.

Then, the configuration control register 23 transmits to the operation code converting circuit 31 and the decoder 32 through connection line 23b the architecture identification bit "1" for scalar unit 12 indicating that the instruction form should be converted. In response to the signal, the operation code converting circuit 31 converts operation code 7F stored in register 33 into 5F, and stores it in register 34.

On the other hand, when the decoder 32 receives a signal from the configuration control register 23, it decodes operation code 7F and outputs a control signal to open AND gates 35, 36, and 37. By opening these AND gates, the register numbers in fields R1 and R3 in the above described instruction ② are exchanged. As a result, register 34 stores the converted operation code 5F and the register numbers exchanged between fields R1 and R3. That is, it stores the vector instruction in the converted form of architecture A. The instruction is transmitted to the vector instruction executing unit 24 through connection line 22a, and then executed therein.

The configuration of the instruction converting circuit 21 connected to scalar unit 11 shown in FIG. 3 is the same as that shown in FIG. 4. The content "0" of the architecture identification bit of scalar unit 11 is output from the configuration control register 23 to the instruction converting circuit 21 through connection line 23a. Since there is no need to convert an instruction form, no instruction form is converted by the operation code converting circuit 31, and a control signal is output by the decoder 32 to open AND gates 38, 36, and 39. Thus, register 34 stores the instruction without exchanging register numbers.

Figure 5:
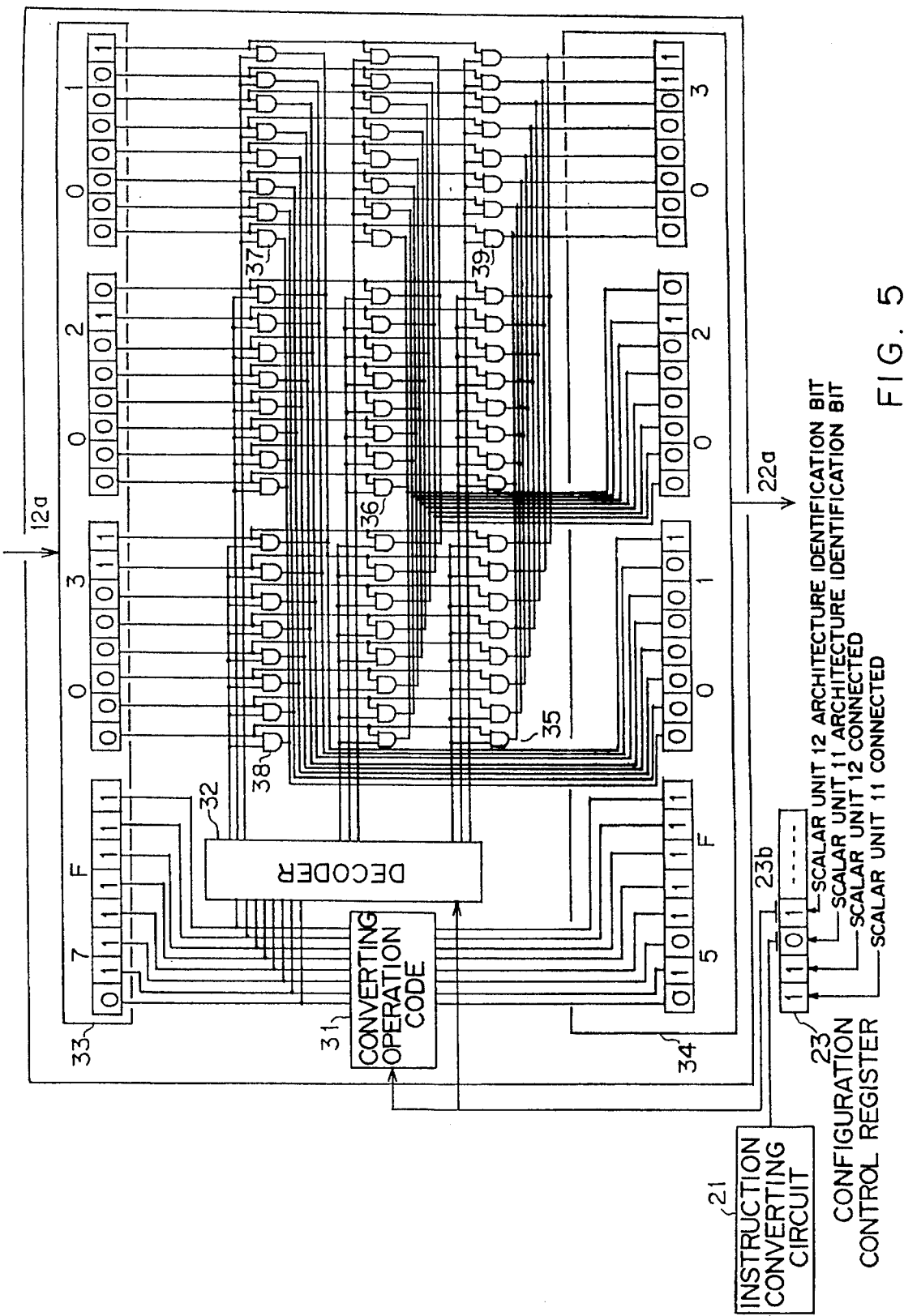
FIG. 5 is the block diagram of the detailed configuration of the instruction converting circuit.

FIG. 5 is the block diagram of the detailed configuration of the instruction converting circuit whose outline is shown in FIG. 4. In FIG. 5, each of the AND gates 35–43, shown conceptually as if it were a single gate in FIG. 4, comprises eight AND gates, and the connections between the operation code converting circuit 31 and registers 33 and 34, and between the decoder 32 and register 33 are explained furthermore in detail. In FIG. 4, the register numbers stored in registers 33 and 34 are shown as 3-digit data, while they are shown as 2-digit hexadecimal data in FIG. 5.

Figure 6A:
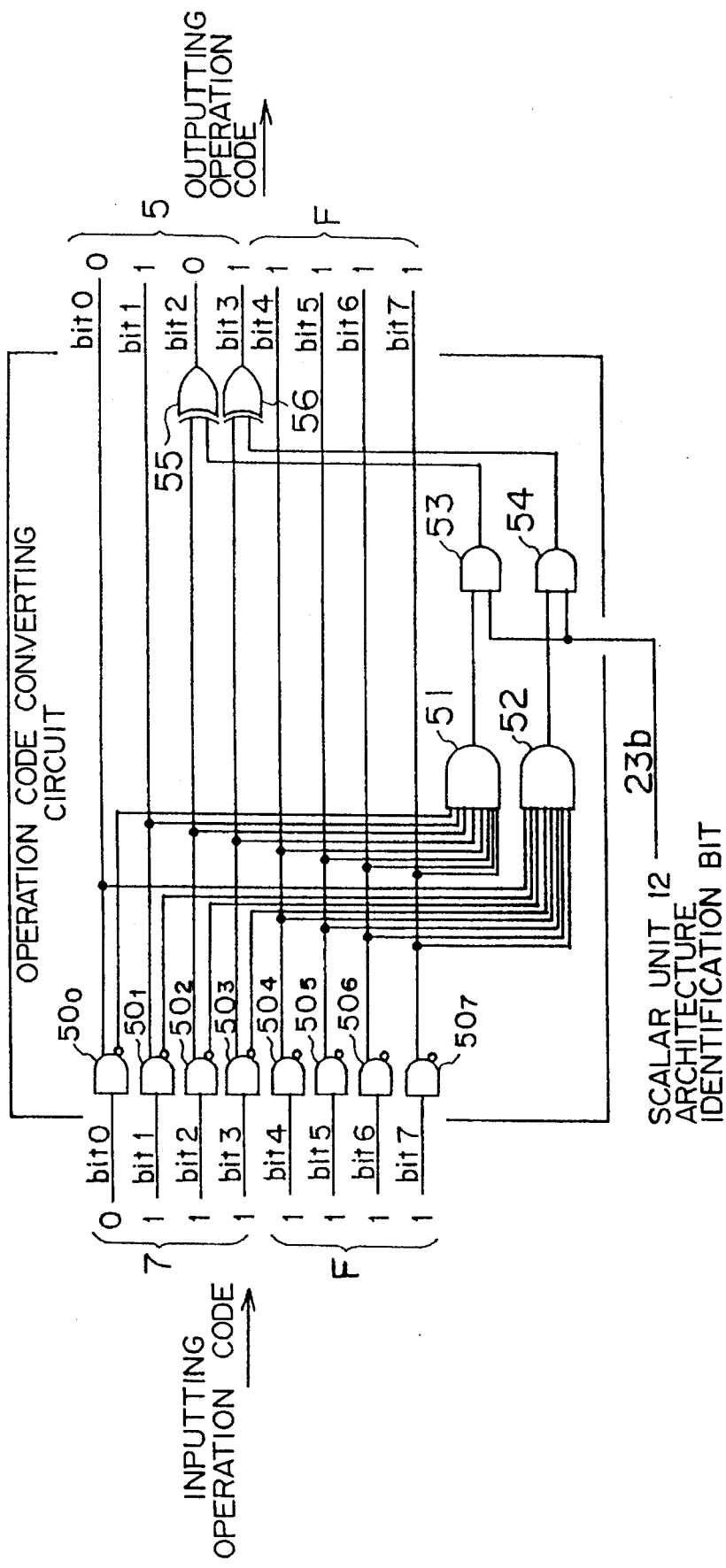
FIG. 6A is the block diagram of the detailed configuration of the operation code converting circuit.
Figures 6B, 6C:
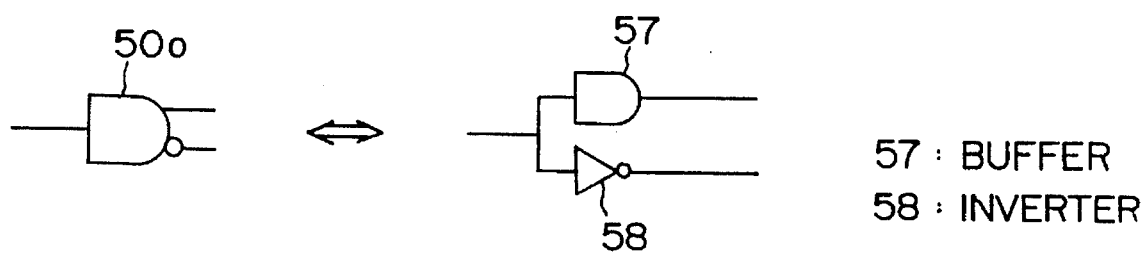
FIG. 6B shows an output of the ExOR gate 55 in the operation code converting circuit.
FIG. 6C shows an example of the configuration of the input-value/inverted-input-value output unit in the operation code converting circuit.

FIGS. 6A through 6C show the detailed configuration of the operation code converting circuit 31 shown in FIGS. 4 and 5. FIGS. 7A and 7B show the operation of converting an operation code by the operation code converting circuit.

In the block diagram of FIG. 6A, the operation code converting circuit comprises input-value/inverted-input-value output units $50_0$–$50_7$, two 8-input AND gates 51 and 52, two input AND gates 53 and 54, and two $E_x$OR gates 55 and 56.

In FIGS. 7A and 7B, the operation of the circuit shown in FIG. 6A is explained on assumption that operation codes 7F and 8F in architecture B are converted into operation codes 5F and 9F in architecture A respectively and that other instructions need not be converted. That is, bit 2 must be inverted to convert operation code 7F into 5F in FIG. 7A, and bit 3 should be inverted to convert operation code 8F into 9F in FIG. 7B.

In FIG. 6A, if operation code 7F (01111111) is input to the seven input-value/inverted-input-value output units $50_0$–$50_7$, then AND gate 51 outputs "1". If "1" is input as the contents of the architecture identification bit of scalar unit 12 in the configuration control register 23 through connection line 23b, then AND gate 53 outputs "1". $E_x$OR gate 55 shown in FIG. 6B outputs an inverted value of the data of bit 2, that is, "0", and, on the other hand, AND gates 52, 54 output "0" and $E_x$OR gate 56 outputs input data of bit 3 as is. Thus, the output of the operation code converting circuit is 5F (01011111), and is provided for register 34.

If operation code 8F shown in FIG. 7B is converted into 9F, AND gates 52 and 54 shown in FIG. 6A output "1", and $E_x$OR gate 56 outputs the inverted value of the input data of bit 3. As a result, the data of bit 3 in operation code 8F (10001111) are inverted, thereby outputting 9F (10011111). If operation code other than 7F or 8F is inputted, the outputs of AND gates 51 and 52 remain "0" and the input operation code is output as is from the operation code converting circuit to register 34.

As shown in FIG. 6C, input-value/inverted-input-value output units $50_0$–$50_3$ are realized by a parallel connection between a buffer 57 and an inverter 58. Input-value/inverted-input-value output units $50_4$–$50_7$ for outputting input values are reasonably realized by a buffer.

Figure 8:
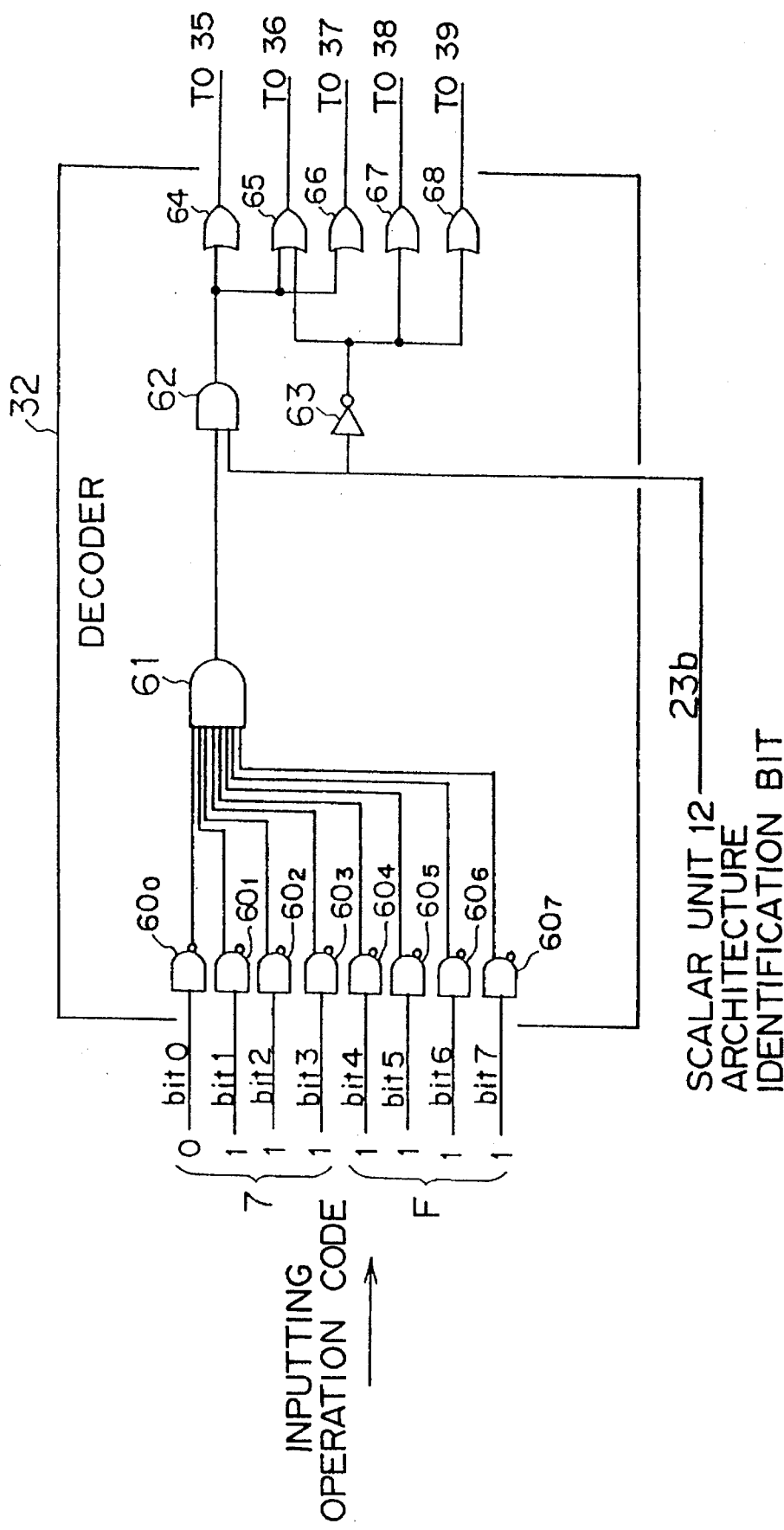
FIG. 8 shows the detailed configuration of the decoder.

FIG. 8 is the block diagram showing correspondingly to FIGS. 4 and 5 the detailed configuration of the decoder 32, shown in FIGS. 4 and 5, for exchanging register numbers when operation code 7F is input.

In FIG. 8, the decoder 32 comprises eight input-value/inverted-input-value output units $60_0$–$60_7$, 8-input AND gate 61, 2-input AND gate 62, inverter 63, and five OR gates 64–68.

In FIG. 8, if operation code 7F (01111111) is applied to seven input-value/inverted-input-value output units 60$_0$–60$_7$, then AND gate 61 outputs "1". AND gate 62 also outputs "1" if the value of the architecture identification bit of scalar unit 12 is "1". As a result, OR gates 64–66 outputs "1" and the outputs of the decoder for AND gates 35–37 shown in FIG. 4 are all "1", thereby exchanging register numbers as described above.

On the other hand, if the architecture identification bit of scalar unit 12 is "0", then AND gate 62 outputs "0", and inverter 63 outputs "1", thereby causing OR gates 65, 67, and 68 to output "1". Thus, the decoder outputs "1" to AND gates 36, 38, and 39 shown in FIG. 4, and the register numbers are stored in registers 33–34 without exchange. The other inputs of OR gates 64, 66 through 68 are not shown in the figure, but are earthed.

The operation of the above described embodiment has been explained based on assumption that scalar unit 11 is designed as having architecture A, scalar unit 12 as having architecture B, and vector unit 13 as having architecture compatible with architecture A. However, it is obvious that the architectures can be exchanged between two scalar units, that both scalar units are designed as having the same architecture, and that vector unit 13 is designed as having architecture compatible with architecture B according to the present invention.

Figure 9:
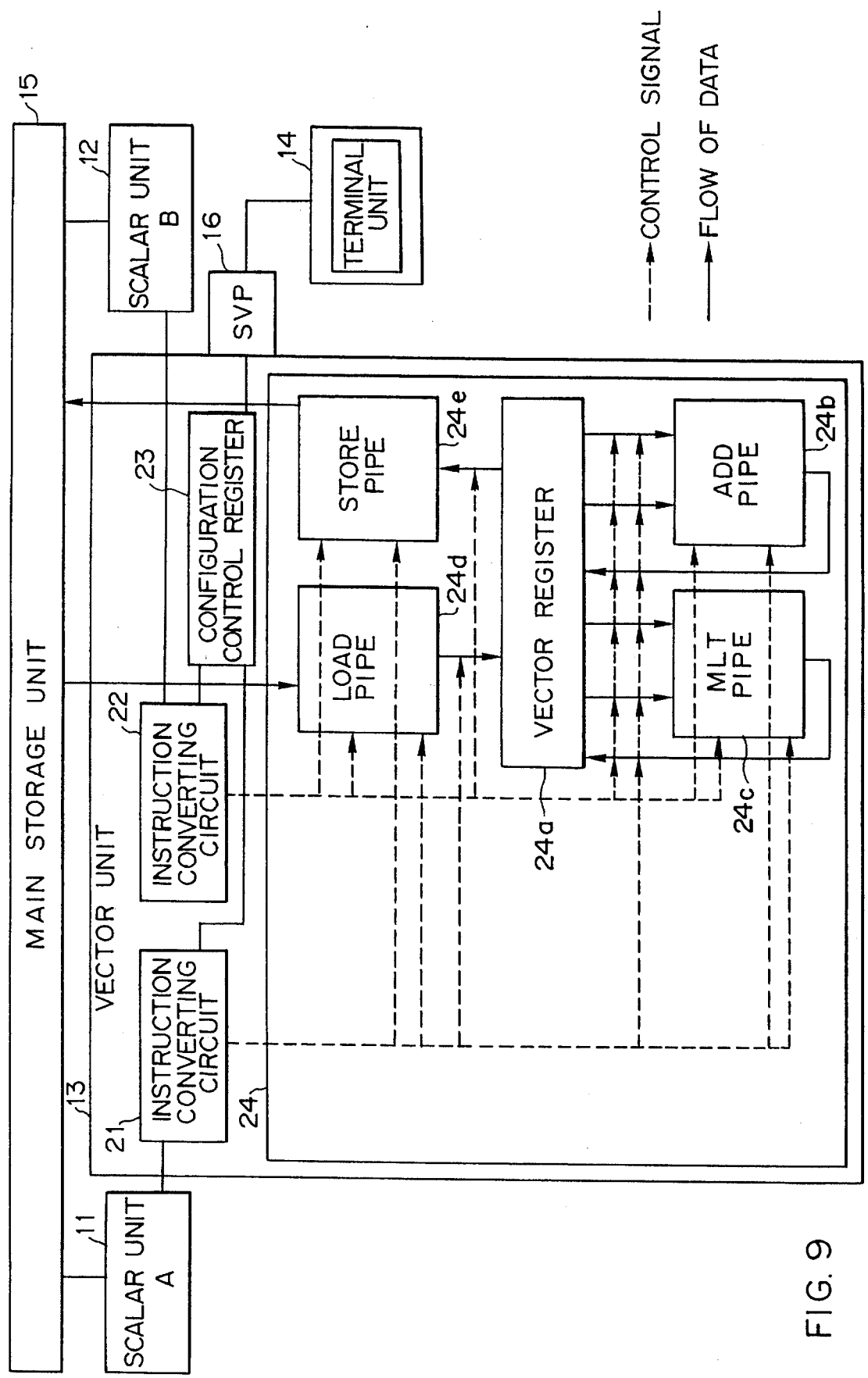
FIG. 9 is the block diagram of the detailed configuration showing an embodiment of the asymmetric vector multiprocessor (DSP system)

FIG. 9 is the block diagram of the detailed configuration showing an embodiment of the asymmetric vector multi-processor according to the present invention. Although it is similar to the basic block diagram of FIG. 3, it shows the internal configuration of the vector instruction executing unit 24 furthermore in detail, and also shows a service processor (SVP) 16 provided between the terminal unit 14 and the configuration control register 23 in the vector unit 13. Additionally shown is a main storage device 15 connected to scalar units 11 and 12, and the vector instruction executing unit 24.

The service processor 16 is a computer system independent of the asymmetric vector multiprocessor unit comprising two scalar units 11 and 12, the vector unit 13, and the main storage device 15, and functions as an interface between the multiprocessor unit and the terminal unit. For example, if the contents of the configuration register are rewritten, a converted value is set in the configuration control register 23 by displaying the contents of the configuration control register on a display unit of the terminal unit, moving the cursor to a display position, entering a value through a keyboard, and then pressing an execution key.

The vector instruction executing unit 24 comprises a vector register 24a for storing data of vector operations; an addition pipe 24b and a multiplication pipe 24c for performing adding and multiplying operations; and a load pipe 24d and a store pipe 24e for inputting and outputting data between the main storage device 15 and the vector register 24a. The operations of these units are controlled according to a vector instruction converted by instruction converting circuits 21 and 22 respectively connected to scalar units 11 and 12.

In a DSP system in which two scalar units are connected to a single vector unit, one scalar unit having a conventional architecture can run an operating system to manage jobs, memories, and I/Os, while the other scalar unit having a new architecture can perform a job. Thus, a scalar unit having a new architecture can be used with the function of the new architecture restricted without introducing a new operating system into the new architecture. Allocating jobs to respective architectures enables data to be efficiently processed.

Figure 10:
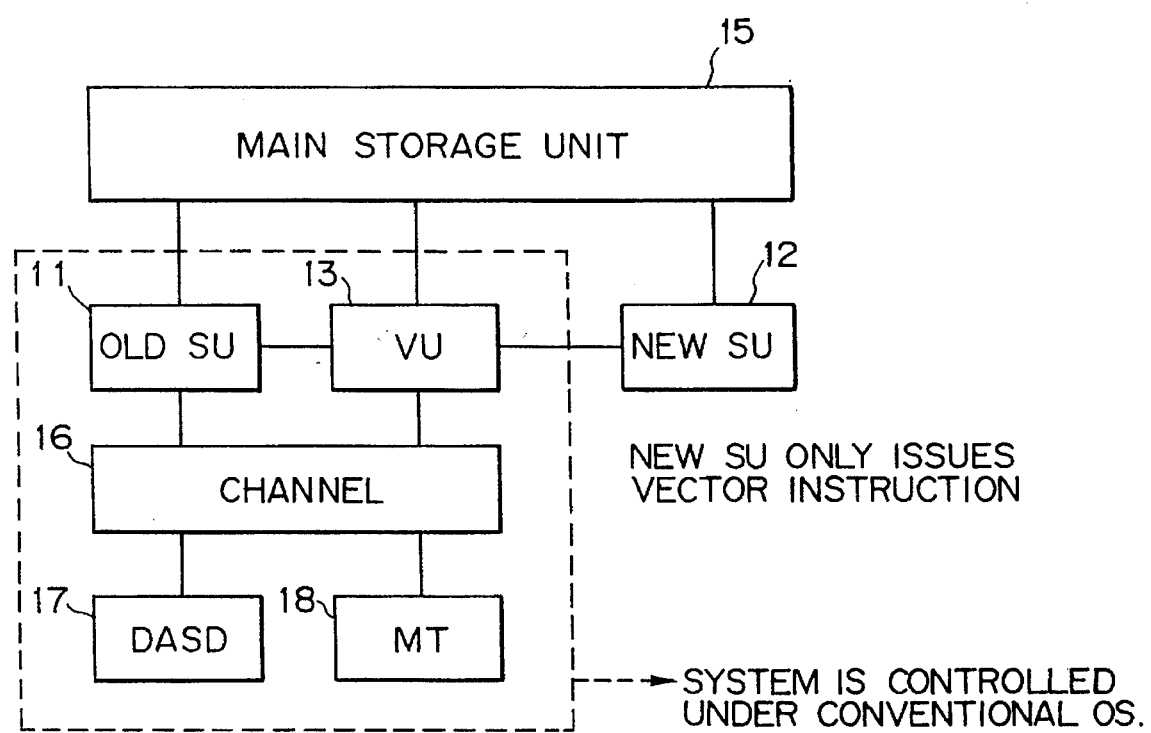
FIG. 10 is the block diagram of the configuration of the DSP system for executing a job through a scalar unit having a new architecture.

FIG. 10 is the block diagram of the configuration showing an embodiment of the DSP system. In FIG. 10, scalar unit 12 has a new architecture, executes a job only, and issues a vector instruction to the vector unit 13. On the other hand, another scalar unit 11 and the vector unit 13 connected to the direct access storage device (DASD) 17 and the magnetic tape storage device (MT) 18 through the channel 16 have conventional architectures, and are controlled by a common operating system.

According to the present invention, a scalar unit having a new architecture can be used without replacing the existing instruction executing unit because a vector instruction in a different form issued by a scalar unit having a new architecture can be converted by an instruction converting circuit into a form executable in a vector unit.

Furthermore, if a plurality of architectures are introduced into a system, plural types of software resources can be utilized, thereby greatly improving the practicability of the computer system.

What is claimed is:

1. An asymmetric vector multiprocessor consisting of a plurality of scalar units for processing scalar instructions and a vector unit for processing a vector instruction transmitted from each of the scalar units, wherein said plurality of scalar units have completely or partially different architectures; and said vector unit comprises:

one or more instruction converting means, each corresponding to each of said one or more architectures different from an architecture of said vector unit among plural types of architectures of said plurality of scalar units, for converting vector instructions transmitted from said one or more scalar units having said one or more architectures into instruction forms executable in said vector unit without changing a language level of the vector instructions; and vector instruction executing means for executing a vector instruction transmitted from said one or more instruction converting means or from the scalar unit having a compatible architecture as said vector unit.

2. The asymmetric vector multiprocessor according to claim 1, wherein said vector unit further comprises:

configuration control register means for storing data indicating an architecture of each scalar unit connected to said vector unit and outputting the data to said instruction converting means.

3. The asymmetric vector multiprocessor according to claim 2, further comprising:

terminal means for setting said data which is stored in said configuration control register means and indicates the architecture of each scalar unit.

4. The asymmetric vector multiprocessor according to claim 1, wherein said instruction converting means comprises:

instruction converting circuit means for converting an instruction into a form executable in said vector unit by converting an instruction code of a vector instruction transmitted from said scalar unit and changing an sequence of storage of register numbers described in said vector instruction.

5. The asymmetric vector multiprocessor according to claim 4, wherein said instruction converting circuit means comprises:

first register means for storing an unconverted instruction;

second register means for storing a converted instruction;

operation code converting circuit means for converting an instruction code stored in said first register means and outputting said converted code to said second register means;

a plurality of AND gate means for changing said sequence of storage of the register numbers stored in said first register means and storing reordered data in said second register means; and decoder means for outputting a gate control signal for the plurality of AND gate means based on the instruction codes stored in said first register means.

6. The asymmetric vector multiprocessor according to claim 1, wherein said vector unit and one or more scalar units, among the plurality of scalar units, having the compatible architecture as said vector unit, are controlled by a common operating system; and one or more scalar units having architectures different from the architecture of said vector unit are used with a restricted function.

7. The asymmetric vector multiprocessor according to claim 6, wherein said one or more scalar units having the architectures different from the architecture of said vector unit are instructed to execute only a job as the restricted function; and a vector instruction issued by said scalar unit is transmitted to said vector unit.

8. The asymmetric vector multiprocessor according to claim 1, wherein said vector instruction executing means comprises a vector instruction executing unit comprising:

vector register means for storing vector operation data;

addition pipe means and multiplication pipe means for respectively performing adding and multiplying operations by sending/receiving data to and from said vector register means; and load pipe means and store pipe means for sending/receiving data between said vector register means and a main storage device.

9. An asymmetric vector multiprocessor consisting of a plurality of scalar units for processing scalar instructions and a vector unit for processing vector instructions transmitted from each of the plurality of scalar units, wherein said plurality of scalar units have completely or partially different architectures; and said vector unit comprises:

a plurality of instruction converting means, each corresponding to each of plural types of architectures of said plurality of scalar units, for converting a vector instruction transmitted from each of said one or more scalar units having each of said plural types of the architectures into an instruction form executable in said vector unit without changing a language level of the vector instruction; and vector instruction executing means for executing a converted vector instruction transmitted from said plurality of instruction converting means.

10. The asymmetric vector multiprocessor according to claim 9, wherein said vector unit further comprises:

configuration control register means for storing data indicating an architecture of each said scalar unit connected to said vector unit and outputting the data to said instruction converting means.

* * * * *